US010210801B2

(12) United States Patent
Lin et al.

(10) Patent No.: US 10,210,801 B2
(45) Date of Patent: Feb. 19, 2019

(54) ELECTRONIC DISPLAY DRIVING SCHEME SYSTEMS AND METHODS

(71) Applicant: Apple Inc., Cupertino, CA (US)

(72) Inventors: Hung Sheng Lin, San Jose, CA (US); Mohammad Ali Jangda, San Jose, CA (US); Chin-Wei Lin, Cupertino, CA (US); Hyunwoo Nho, Stanford, CA (US); Vasudha Gupta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 15/012,378

(22) Filed: Feb. 1, 2016

(65) Prior Publication Data

US 2017/0092192 A1 Mar. 30, 2017

Related U.S. Application Data

(60) Provisional application No. 62/233,732, filed on Sep. 28, 2015.

(51) Int. Cl.
*G06F 1/00* (2006.01)
*G09G 3/3233* (2016.01)
(Continued)

(52) U.S. Cl.
CPC ......... *G09G 3/3233* (2013.01); *G09G 3/3225* (2013.01); *G09G 3/3258* (2013.01); *G09G 3/3275* (2013.01); *G09G 3/3648* (2013.01); *G09G 3/3688* (2013.01); *G09G 2310/0248* (2013.01); *G09G 2310/063* (2013.01); *G09G 2310/08* (2013.01); *G09G 2320/0209* (2013.01); *G09G 2320/029* (2013.01); *G09G 2320/0233* (2013.01); *G09G 2320/0247* (2013.01); *G09G 2320/041* (2013.01); *G09G 2320/0646* (2013.01); *G09G 2320/08* (2013.01); *G09G 2340/0435* (2013.01); *G09G 2360/16* (2013.01)

(58) Field of Classification Search
CPC .. G09G 5/00; G09G 3/36; G09G 3/34; H04N 5/66; G06F 3/038
See application file for complete search history.

(56) References Cited

U.S. PATENT DOCUMENTS 6,753,835 B1 6/2004 Sakai
8,289,251 B2 * 10/2012 Tsubata ................. G09G 3/342 345/100

(Continued)

FOREIGN PATENT DOCUMENTS

KR 20080010946 A 1/2008

OTHER PUBLICATIONS

International Search Report and Written Opinion for PCT Application No. PCT/US2016/047815 dated Nov. 4, 2016; 13 pgs.

*Primary Examiner* — Michael Faragalla
(74) *Attorney, Agent, or Firm* — Fletcher Yoder PC

(57) ABSTRACT

An electronic device includes a display and a controller. The controller is configured to receive one or more operational characteristics of the display. The controller is also configured to calculate a blank time voltage level for a data line of the display based on the one or more operational characteristics, wherein the blank time voltage level corresponds to a voltage transmitted along the data line of the display immediately subsequent to image data being transmitted along the data line.

21 Claims, 7 Drawing Sheets

(51) Int. Cl.

| | |
|---|---|
| ***G09G 3/3258*** | (2016.01) |
| ***G09G 3/3275*** | (2016.01) |
| ***G09G 3/36*** | (2006.01) |
| ***G09G 3/3225*** | (2016.01) |

(56) References Cited

U.S. PATENT DOCUMENTS

| | | | | |
|---|---|---|---|---|
| 9,110,527 | B2 | 8/2015 | Bi et al. | |
| 2004/0222943 | A1 | 11/2004 | Kudo et al. | |
| 2006/0001628 | A1 | 1/2006 | Kawaguchi | |
| 2013/0135330 | A1 | 5/2013 | Choi et al. | |
| 2014/0028640 | A1* | 1/2014 | Kimura | G09G 3/3614 345/204 |
| 2014/0160182 | A1* | 6/2014 | Hong | G09G 3/3696 345/691 |
| 2014/0267349 | A1 | 9/2014 | Lee | |
| 2015/0340355 | A1* | 11/2015 | Zhang | G01R 19/00 361/86 |

* cited by examiner

ELECTRONIC DISPLAY DRIVING SCHEME SYSTEMS AND METHODS

CROSS REFERENCE TO RELATED APPLICATIONS

This application is a Non-Provisional application of U.S. Provisional Patent Application No. 62/233,732, entitled "Electronic Display Driving Scheme System and Methods" filed Sep. 28, 2015, which is herein incorporated by reference.

BACKGROUND

The present disclosure relates generally to electronic displays and, more particularly, to driving schemes utilized in conjunction with electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays may be found in a variety of devices, such as computer monitors, televisions, instrument panels, mobile phones, and clocks. One type of electronic display, known as a liquid crystal display (LCD), displays images by modulating the amount of light allowed that passes through a liquid crystal layer within display pixels of the LCD. In general, LCDs modulate the light passing through each display pixel by varying a voltage difference between a pixel electrode and a common electrode (VCOM). This creates an electric field that causes the liquid crystal layer to change alignment. The change in alignment of the liquid crystal layer causes differing amounts of light to pass through the display pixel. By changing the voltage difference supplied to each display pixel, images are produced on the LCD. Another type of electronic display, known as an organic light-emitting diode (OLED) display, which may include light-emitting devices including one or more layers of organic materials interposed between a pixel electrode and a common electrode (VCOM). Specifically, the OLED display may display images by driving individual OLED display pixels to store image data and image brightness data. In either case of LCDs or OLEDs, parasitic capacitances may be present in the individual display pixels and may cause unwanted interference (e.g., vertical cross talk) that may lead to visual artifacts (e.g., luminance variations, flicker, or the like) being generated and viewable by a user. It would be desirable to reduce these visual artifacts of a display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to electronic displays that display image frames to facilitate visually presenting information. Generally an electronic display displays an image frame by controlling luminance of its display pixels based at least in part on image data indicating desired luminance of the display pixels. For example, to facilitate displaying an image frame, an organic light emitting diode (OLED) display or a liquid crystal display (LCD) may receive image data and supply the image data to display pixels. When activated, the display pixels may apply the image data to the gate of a switching device (e.g., a thin-film transistor) to control magnitude of the supply current flowing through a light emitting component (e.g., an OLED or a liquid crystal). In this manner, since the luminance of display pixels is based on supply current flowing through their light emitting components, the image frame may be displayed based at least in part on corresponding image data.

However, luminance of display pixels may also be affected by other factors. For example, parasitic capacitance introduced between the data line and a storage capacitor may cause luminance variations in the display pixels. When drastic enough, the luminance variations may be perceivable as visual artifacts.

Accordingly, the techniques described herein facilitate improving displayed image quality of a display by reducing or mitigating parasitic capacitances in a display to reduce and/or minimize the display of perceivable visual artifacts. For example, the display may utilize drive schemes that set a final data line voltage to a predetermined value which is not read into the display pixels of the display. This predetermined value may be selected to minimize and/or mitigate parasitic capacitance between the data lines of the display and their respective display pixels.

BRIEF DESCRIPTION OF THE DRAWINGS

Various aspects of this disclosure may be better understood upon reading the following detailed description and upon reference to the drawings in which.

DETAILED DESCRIPTION

Figure 1:
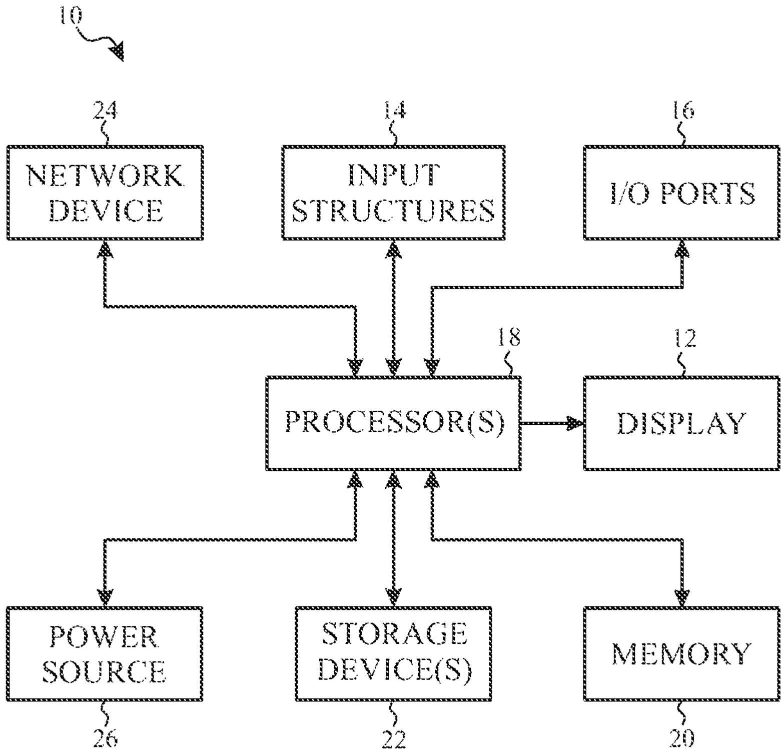
FIG. 1 is a block diagram of a electronic device with an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, the present disclosure relates to electronic displays used to display visual representations as image frames. Thus, electronic displays are often included in various electronic devices to facilitate visually presenting information to users. In fact, different electronic devices may utilize different types of electronics displays. For example, some electronic devices may utilize a liquid crystal (LCD) display while other electronic devices utilize organic light emitting diode (OLED) display, such as active matrix organic light emitting diode (AMOLED) displays and passive matrix organic light emitting diode (PMOLED) displays, and still other electronic devices may utilize micro light emitting diode (μLED) displays.

However, operation between different types of electronic displays may vary. For example, an LCD display may display an image frame by controlling luminance (e.g., brightness and/or grayscale value) of LCD display pixels based on orientation of liquid crystals. More specifically, in an LCD display pixel, a voltage based on received image data may be applied to a pixel electrode, thereby generating an electric field that orients the liquid crystals.

In contrast, an OLED display may display an image frame by controlling luminance (e.g., brightness and/or grayscale value) of OLED display pixels based on magnitude of supply current flowing through a light emitting component (e.g., OLED) of the display pixels. More specifically, a voltage based on received image data may be applied to the gate of a switching device (e.g., thin-film transistor) in an OLED display pixel to control magnitude of supply current flowing to its light emitting component.

Although differences exist, some operational principles of different types of electronic displays may be similar. For example, as described above, the LCD display and the OLED display may both display image frames by controlling luminance of their display pixels. Additionally, the LCD display and the OLED display may both control luminance of their display pixels based on received image data, which may indicate desired luminance of display pixels based on magnitude of its voltage. Furthermore, in some embodiments, the LCD display and the OLED display may use the image data to control operation in their display pixels. In other words, although the present disclosure is described primarily in regard to OLED displays, the techniques described herein are applicable to other types of suitable electronic displays.

As described above, an OLED display may display image frames by controlling luminance of its display pixels. In some embodiments, an OLED display pixel may include a self-emissive light emitting component that emits light based at least in part on magnitude of current supplied to a storage capacitor. For example, as magnitude of the supply current increases, the luminance of the display pixel may also increase. On the other hand, as magnitude of the supply current decreases, the luminance of the display pixel may also decrease.

Additionally, the OLED display may control magnitude of the supply current to the display pixel using a switching device (e.g., a thin-film transistor). In some embodiments, the OLED display may receive image data indicating desired luminance of the display pixel apply the image data to a gate of the switching device. In such embodiments, voltage of the image data may control width of the switching device channel available to conduct supply current to the light emitting component. For example, as magnitude of the image data increases, the magnitude of the supply current may increase. On the other hand, as magnitude of the image data decreases, the magnitude of the supply current may decrease. In this manner, the OLED display may adjust luminance of the display pixels based at least in part on received image data.

However, the luminance of OLED display pixels may also be affected by other factors, such as interaction between the data line and the storage capacitor of the display pixel. More particularly, a parasitic capacitance may be generated between the data line and the storage capacitor of a display pixel. This parasitic capacitance may generate luminance variations that may be perceivable as visual artifacts.

Accordingly, as will be described in more detail below, the techniques and devices described herein facilitate improving displayed image quality of a display by reducing likelihood of parasitic capacitance in a display pixel or mitigating the parasitic capacitance to reduce the generation of visual artifacts and may reduce likelihood of displaying a perceptible visual artifact.

To help illustrate, a computing device 10 that may utilize an electronic display 12 to display image frames is described in FIG. 1. As will be described in more detail below, the computing device 10 may be any suitable computing device, such as a handheld computing device, a tablet computing device, a notebook computer, and the like.

Accordingly, as depicted, the computing device 10 includes the electronic display 12, input structures 14, input/output (I/O) ports 16, one or more processor(s) 18, memory 20, a non-volatile storage device 22, a network interface 24, and a power source 26. The various components described in FIG. 1 may include hardware elements (e.g., circuitry), software elements (e.g., a tangible, non-transitory computer-readable medium storing industrious), or a combination of both hardware and software elements. It should be noted that FIG. 1 is merely one example of a particular implementation and is intended to illustrate the types of components that may be present in the computing device 10. Additionally, it should be noted that the various depicted components may be combined into fewer components or separated into additional components. For example, the memory 20 and the non-volatile storage device 22 may be included in a single component.

As depicted, the processor 18 is operably coupled with memory 20 and/or the non-volatile storage device 22. More specifically, the processor 18 may execute instruction stored in memory 20 and/or non-volatile storage device 22 to perform operations in the computing device 10, such as generating and/or transmitting image data to the electronic display 12. As such, the processor 18 may include one or more general purpose microprocessors, one or more application specific processors (ASICs), one or more field programmable logic arrays (FPGAs), or any combination thereof.

Additionally, the memory 20 and the non-volatile storage device 22 may be tangible, non-transitory, computer-readable mediums that store instructions executable by and data to be processed by the processor 18. For example, the memory 20 may include random access memory (RAM) and the non-volatile storage device 22 may include read only memory (ROM), rewritable flash memory, hard drives, optical discs, and the like. By way of example, a computer program product containing the instructions may include an operating system or an application program.

Additionally, as depicted, the processor 18 is operably coupled with the network interface 24 to communicatively couple the computing device 10 to a network. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. Furthermore, as depicted, the processor 18 is operably coupled to the power source 26, which may provide power to the various components in the computing device 10, such as the electronic display 12. As such, the power source 26 may include any suitable source of energy, such as a rechargeable lithium polymer (Li-poly) battery and/or an alternating current (AC) power converter.

As depicted, the processor 18 is also operably coupled with I/O ports 16, which may enable the computing device 10 to interface with various other electronic devices, and input structures 14, which may enable a user to interact with the computing device 10. Accordingly, the inputs structures 14 may include buttons, keyboards, mice, trackpads, and the like. Additionally, the electronic display 12 may include touch components that facilitate user inputs by detecting occurrence and/or position of an object touching its screen (e.g., surface of the electronic display 12).

In addition to enabling user inputs, the electronic display 12 presents visual representations by displaying display image frames, such as a graphical user interface (GUI) for an operating system, an application interface, a still image, or video content. As depicted, the electronic display 12 is operably coupled to the processor 18. Accordingly, image frames displayed by the electronic display 12 may be based on image data received from the processor 18. As will be described in more detail below, in some embodiments, the electronic display 12 may display image frames by controlling supply current flowing into one or more display pixels.

Figure 2:
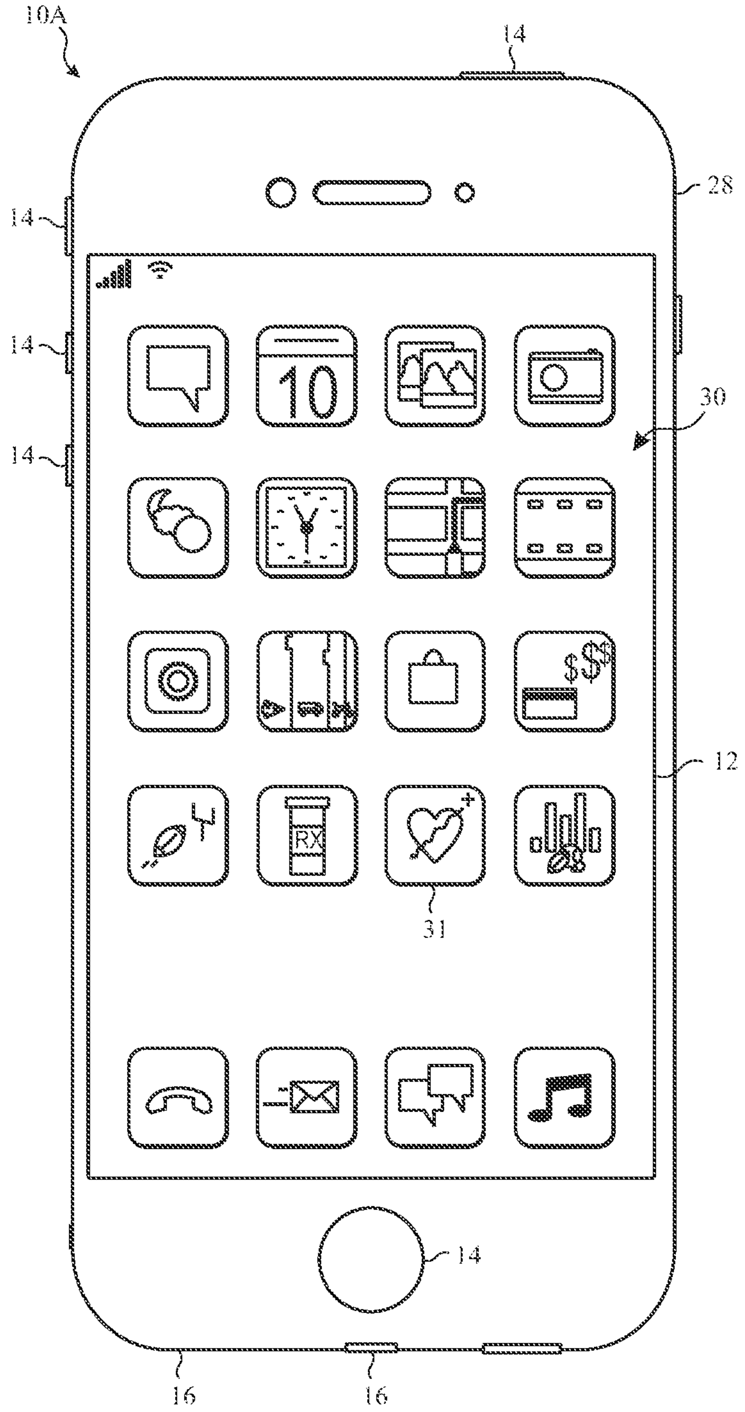
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and to shield them from electromagnetic interference. The enclosure 28 may surround the electronic display 12, which, in the depicted embodiment, displays a graphical user interface (GUI) 30 having an array of icons 31. By way of example, when an icon 31 is selected either by an input structure 14 or a touch component of the electronic display 12, an application program may launch.

Additionally, as depicted, input structure 14 may open through the enclosure 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 16 open through the enclosure 28. In some embodiments, the I/O ports 16 may include, for example, an audio jack to connect to external devices.

Figure 3:
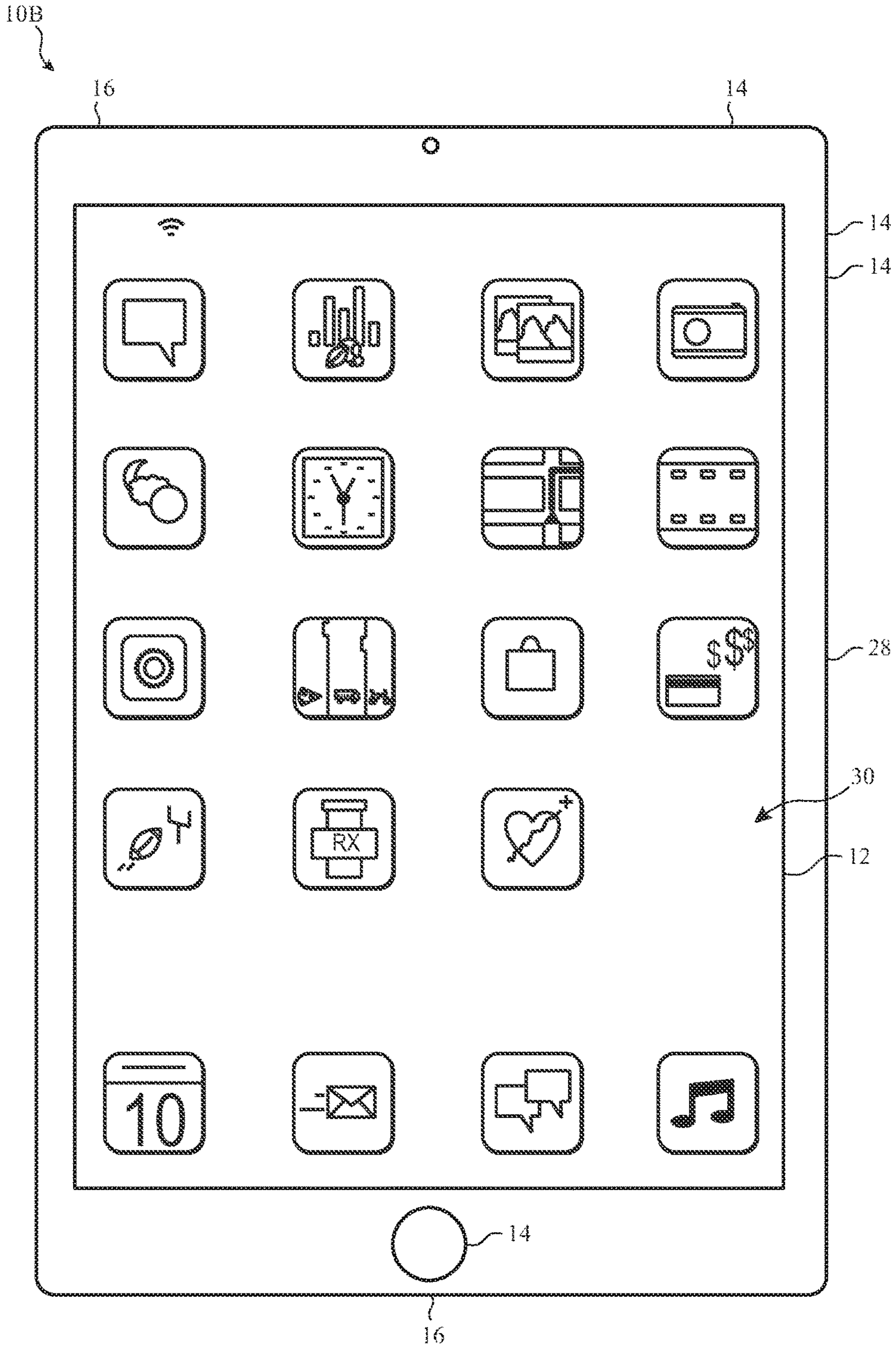
FIG. 3 is an example of the electronic device of FIG. 1, in accordance with an embodiment.
Figure 4:
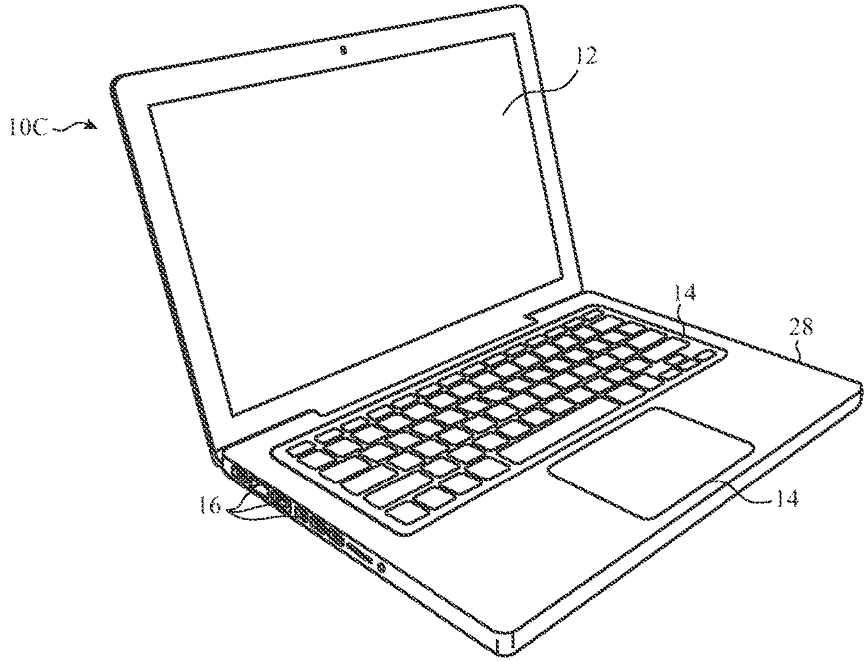
FIG. 4 is an example of the electronic device of FIG. 1, in accordance with an embodiment.
Figure 5:
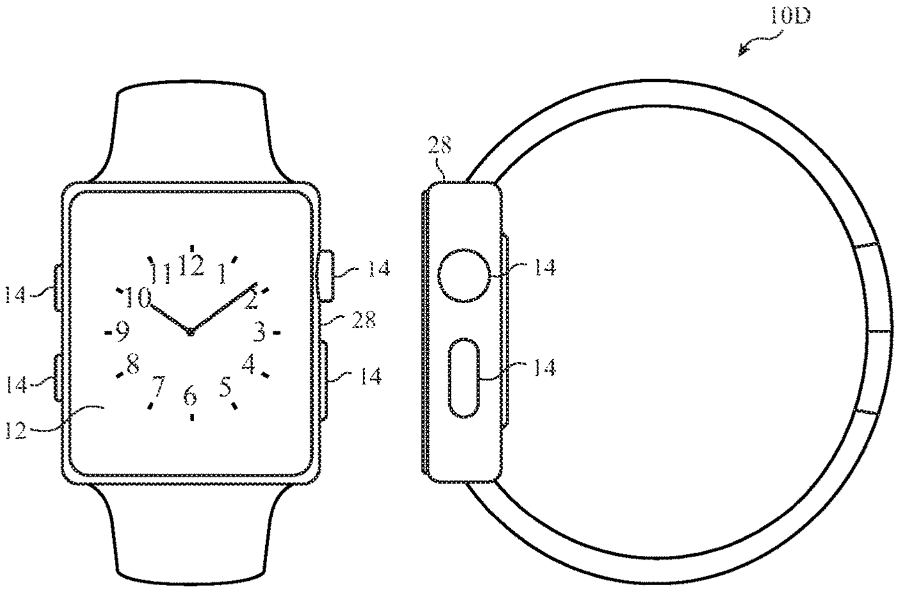
FIG. 5 is an example of the electronic device of FIG. 1, in accordance with an embodiment.

To further illustrate a suitable computing device 10, a tablet device 10B is described in FIG. 3, such as any iPad® model available from Apple Inc. Additionally, in other embodiments, the computing device 10 may take the form of a computer 10C as described in FIG. 4, such as any Macbook® or iMac® model available from Apple Inc. Furthermore, in other embodiments, the computing device 10 may take the form of a watch 10D as described in FIG. 5, such as an Apple Watch® model available from Apple Inc. As depicted, the tablet device 10B, the computer 10C, and the watch 10D may each also include an electronic display 12, input structures 14, I/O ports 16, an enclosure 28, or any combination thereof.

As described above, the computing device 10 may include an electronic display 12 to facilitate presenting visual representations to one or more users. Accordingly, the electronic display 12 may be any one of various suitable types. For example, in some embodiments, the electronic display 12 may be an LCD display while, in other embodiments, the display may be an OLED display, such as an AMOLED display or a PMOLED display. Although operation may vary, some operational principles of different types of electronic displays 12 may be similar. For example, electronic displays 12 may generally display image frames by controlling luminance of their display pixels based on received image data.

Figure 6:
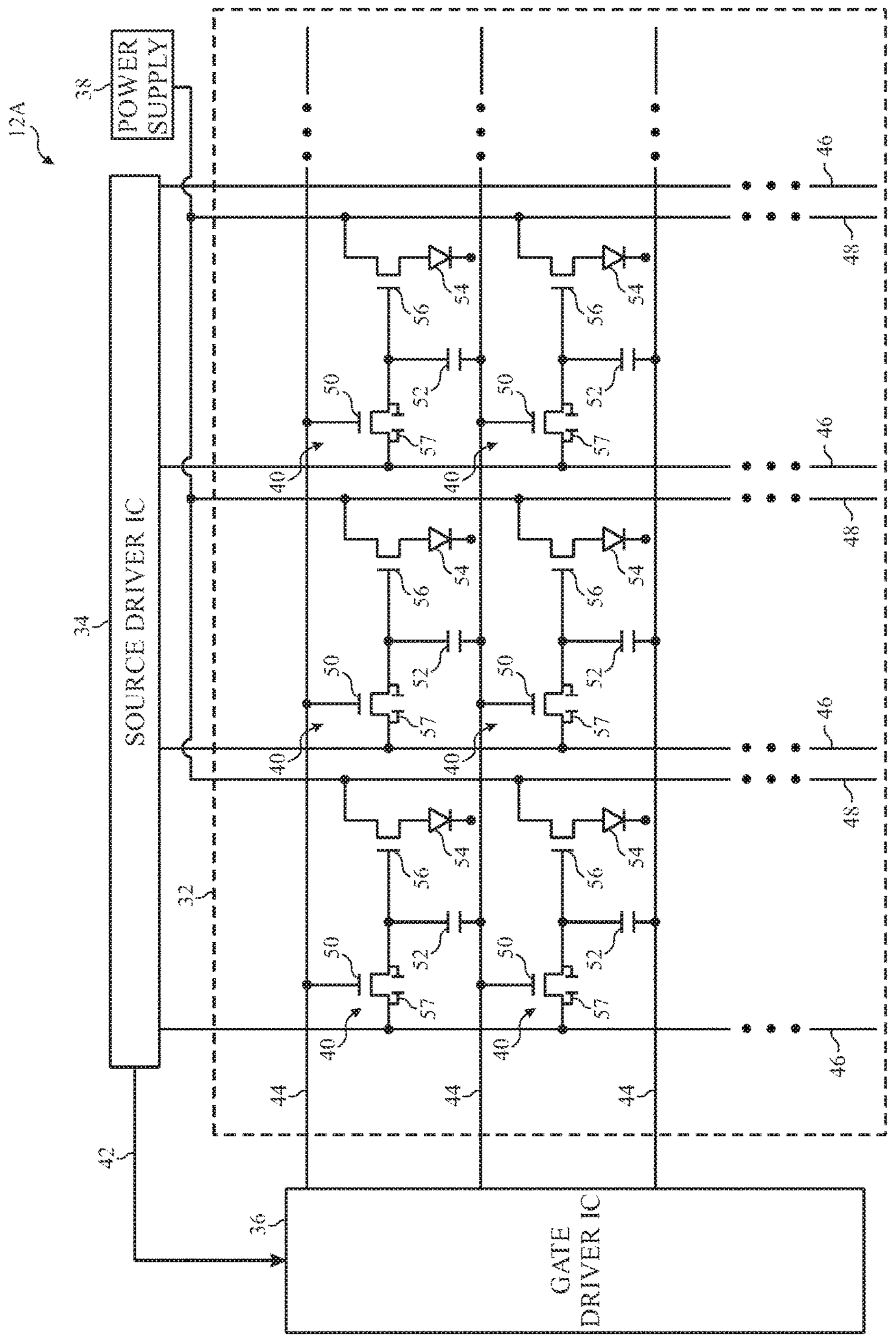
FIG. 6 is a block diagram of an organic light emitting diode (OLED) electronic display, in accordance with an embodiment.

To help illustrate, one embodiment of an OLED display 12A that can be used with any of the computing devices 10 illustrated in FIGS. 1-5 is described in FIG. 6. As depicted, the OLED display 12A includes a display panel 32, a source driver 34, a gate driver 36, and a power supply 38. Additionally, the display panel 32 may include multiple display pixels 40 arranged as an array or matrix defining multiple rows and columns. For example, the depicted embodiment includes a six display pixels 40. It should be appreciated that although only six display pixels 40 are depicted, in an actual implementation the display panel 32 may include hundreds or even thousands of display pixels 40.

As described above, an electronic display 12 generally, and display 12A specifically, may display image frames by controlling luminance of its display pixels 40 based at least in part on received image data. To facilitate displaying an image frame, a timing controller may determine and transmit timing data 42 to the gate driver based at least in part on the image data. For example, in the depicted embodiment, the timing controller may be included in the source driver 34. Accordingly, in such embodiments, the source driver 34 may receive image data that indicates desired luminance of one or more display pixels 40 for displaying the image frame, analyze the image data to determine the timing data 42 based at least in part on what display pixels 40 the image data corresponds to, and transmit the timing data 42 to the gate driver 36. Based at least in part on the timing data 42, the gate driver 36 may then transmit gate activation signals to activate a row of display pixels 40 via a gate line 44.

When activated, luminance of a display pixel 40 may be adjusted by image data received via data lines 46. In some embodiments, the source driver 34 may generate the image data by receiving the image data and voltage of the image data. The source driver 34 may then supply the image data to the activated display pixels 40. Thus, as depicted, each display pixel 40 may be located at an intersection of a gate line 44 (e.g., scan line) and a data line 46 (e.g., source line). Based on received image data, the display pixel 40 may adjust its luminance using electrical power supplied from the power supply 38 via power supply lines 48.

As depicted, each display pixel 40 includes a circuit switching thin-film transistor (TFT) 50, a storage capacitor 52, an OLED 54, and a driving TFT 56 (whereby each of the storage capacitor 52 and the OLED 54 are coupled to a common voltage, Vcom). To facilitate adjusting luminance, the driving TFT 56 and the circuit switching TFT 50 may each serve as a switching device that is controllably turned on and off by voltage applied to its respective gate. In the depicted embodiment, the gate of the circuit switching TFT 50 is electrically coupled to a gate line 44. Accordingly, when a gate activation signal received from its gate line 44 is above its threshold voltage, the circuit switching TFT 50 may turn on, thereby activating the display pixel 40 and charging the storage capacitor 52 with image data received at its data line 46.

Additionally, in the depicted embodiment, the gate of the driving TFT 56 is electrically coupled to the storage capacitor 52. As such, voltage of the storage capacitor 52 may control operation of the driving TFT 56. More specifically, in some embodiments, the driving TFT 56 may be operated in an active region to control magnitude of supply current flowing from the power supply line 48 through the OLED 54. In other words, as gate voltage (e.g., storage capacitor 52 voltage) increases above its threshold voltage, the driving TFT 56 may increase the amount of its channel available to conduct electrical power, thereby increasing supply current flowing to the OLED 54. On the other hand, as the gate voltage decreases while still being above its threshold voltage, the driving TFT 56 may decrease amount of its channel available to conduct electrical power, thereby decreasing supply current flowing to the OLED 54. In this manner, the OLED display 12A may control luminance of the display pixel 40. The OLED display 12A may similarly control luminance of other display pixels 40 to display an image frame.

As described above, image data may include a voltage indicating desired luminance of one or more display pixels 40. Accordingly, operation of the one or more display pixels 40 to control luminance should be based at least in part on the image data. In the OLED display 12A, a driving TFT 56 may facilitate controlling luminance of a display pixel 40 by controlling magnitude of supply current flowing into its OLED 54. Additionally, the magnitude of supply current flowing into the OLED 54 may be controlled based at least in part on voltage supplied by a data line 46, which is used to charge the storage capacitor 52. However, voltage supplied by the data line 46 also can also generate parasitic capacitance between the data line 46 and the storage capacitor 52 for each display pixel 40, which is illustrated in FIG. 6 as parasitic capacitor 57. Parasitic capacitor 57 may create an unwanted path that generates vertical cross talk in the display pixel 40, which may lead to the generation of visual artifacts on the display 12A. Techniques and components are discussed below that may mitigate and/or compensate for the presence of parasitic capacitor 57 in the display pixels 40.

Figure 7:
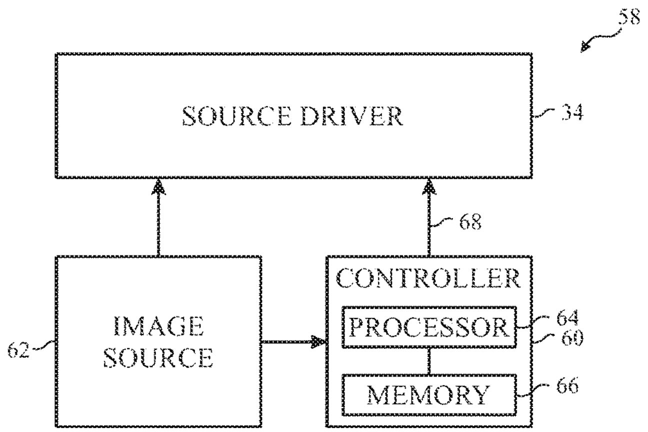
FIG. 7 is a block diagram of a portion of the OLED electronic display of FIG. 6, in accordance with an embodiment.

FIG. 7 illustrates a more detailed view of a portion 58 of the OLED display 12A, which includes the source driver 34 and a controller 60. As depicted, the source driver 34 may receive image data from an image source 62, such as the processor 18, a graphics processing unit, the controller 60, a display pipeline, or the like. Additionally, controller 60 may generally control operation of the source driver 34 and/or other portions of the electronic display 12. To facilitate controlling operating, the controller 60 may include a controller processor 64 and controller memory 66. More specifically, the controller processor 64 may execute instructions and/or process data stored in the controller memory 66 to control operation in the electronic display 12. Accordingly, in some embodiments, the controller processor 64 may be included in the processor 18 and/or separate processing circuitry and the memory 66 may be included in memory 20 and/or a separate tangible non-transitory computer-readable medium. Furthermore, in some embodiments, the controller 60 may be included in the source driver 34 (e.g., as a timing controller) or as separate discrete circuitry internal to a common enclosure with the display 12A or in a separate enclosure from the display 12A. The controller 60 may be a digital signal processor (DSP), an application-specific integrated circuit (ASIC), or an additional processing unit.

The controller processor 64 may interact with one or more tangible, non-transitory, machine-readable media (e.g., memory 66) that stores instructions executable by the controller to perform the method and actions described herein. By way of example, such machine-readable media can comprise RAM, ROM, EPROM, EEPROM, or any other medium which can be used to carry or store desired program code in the form of machine-executable instructions or data structures and which can be accessed by the processor or by any processor, controller, ASIC, or other processing device of the controller 60.

The controller 60 may receive information related to the operation of the display 12A and may alter voltages transmitted along the data lines 46 of the display 12A. For example, the controller 60 may receive an indication of the refresh rate of the display 12A (e.g., the frequency at which data is written fully into the array of display pixels 40 of the display). The controller 60 may also receive an indication of the data being written into the display 12A from the image source 62. Similarly, the controller may receive an indication of the temperature (e.g., an ambient temperature and/or the temperatures inside of the device 10). The refresh rate of the display 12A, the data being written into the display 12A, and the temperature each impact the amount of capacitance of parasitic capacitor 57. Accordingly, the controller 60 may alter its output 68 based on the indications of the refresh rate of the display 12A, the data being written into the display 12A, and/or the temperature so as to more effectively mitigate and/or reduce the effects of the parasitic capacitors 57 on the images produced by the display 12A. Additionally, the controller 60 may receive an activation indication signal, which may control activation and deactivation of the controller 60. This activation indication signal may be a binary on/off signal, or a similar signal, that operates to activate or deactivate the controller 60 based on, for example, power requirements of the device 10 (e.g., deactivating the controller 60 based on power conservation determinations by the device 10).

To produce output 68, the controller 60 may store the received indications of the refresh rate of the display 12A and the indications of the temperature in the memory 66. The controller 60 may also, for example, receive indications of the data line voltages being transmitted to the data lines 46 (e.g., the data being written into the display 12A). The controller 60 may first store the indications of the data line voltages being transmitted to the data lines 46 in memory 66 or may directly use the indications to calculate and transmit a blank time voltage indication for each data line 46 as the output 68. That is, the controller 60 may calculate and transmit a blank time voltage indication for each data line 46 as the output 68 based on one or more of the received indications of the refresh rate of the display 12A, the indication of the temperature, and the indication of the data line voltage 46 being transmitted to that data line 46. This calculated blank time voltage indication is calculated to selectively minimize or compensate for the parasitic capacitance of parasitic capacitor 57 of a particular display pixel 40 having data transmitted thereto via the data line (e.g., an activated display pixel 40), depending on one or more settings of the controller 60 as directed by, for example, the processor 18.

The output 68 calculated and transmitted by the controller 60 may correspond to a voltage to be applied to the data line 46 subsequent to or immediately subsequent to image data being transmitted along the data line 46 to a particular display pixel 40. In this manner, output 68 may cause the source driver 34 to transmit a parked voltage (e.g., blanking period voltage) along the data line 46 subsequent to or immediately subsequent to the transmission of image data along data line 46. However, unlike the image data that is read into a given display pixel 40, the parked voltage generated by the source driver 34 is not read into the display pixel 40. Instead, the parked voltage operates to reduce or mitigate the parasitic capacitance associated with parasitic capacitor 57 in the given display pixel 40. The controller 60 may repeat the process of calculating and transmitting a blank time voltage indication for each data line 46 such that each individual data line 46 may have its own parked voltage subsequent to or immediately subsequent to a data image transmission thereon (e.g., subsequent to or immediately subsequent to a display refresh period of the data line 46).

Figure 8:
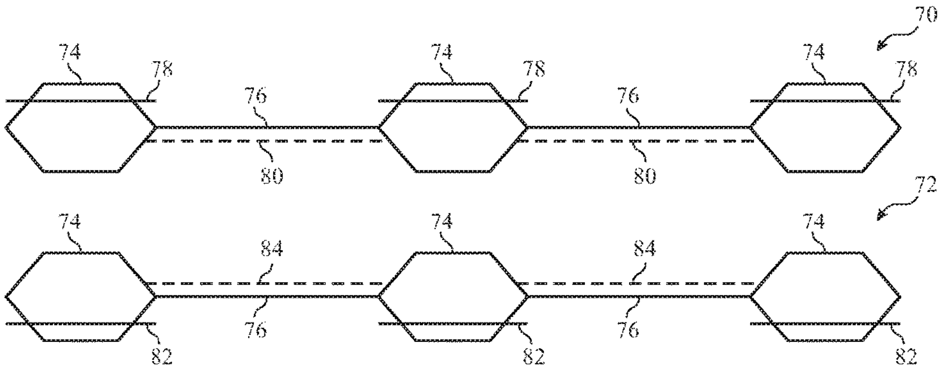
FIG. 8 illustrates timing diagrams of the OLED electronic display of FIG. 6 operating in a first mode, in accordance with an embodiment.

FIG. 8 illustrates timing diagrams 70 and 72 of one of the data lines 46 of the display 12A. As illustrated, each refresh period 74 for the data line 46 may represent a period of time in which a display pixel 40 coupled to the data line 46 is having image data driven thereto from the data line 46. Each of the refresh periods 74 is followed by a blanking period 76 (e.g., blank time) during which image data is being driven on other data lines 46 of the display 12A. Furthermore, as illustrated in timing diagram 70, a data voltage 78 is represented, whereby the data voltage 78 corresponds to the voltage level of the image data being transmitted to a display pixel 40 during a refresh period 74. As illustrated, the data voltage 78 may correspond to a relative high data voltage value.

As discussed above, the controller 60 may receive (at least) an indication of the refresh rate of the display 12A (which may correspond to the refresh periods 74), an indication of the temperature, and an indication of the data line 46 voltage (e.g., the data voltage 78). The controller 60 may calculate and transmit a blank time voltage indication for the data line 46 as the output 68 based on one or more of the received indications, whereby the output 68 causes the source driver 34 to transmit a blank time voltage 80 along data line 46 subsequent to or immediately subsequent to transmission of the image data along the data line 46. As illustrated in timing diagram 70, this blank time voltage 80 may be generally lower than the data voltage 78 so as to compensate (e.g., offset) the relatively high data voltage 78 to mitigate the parasitic capacitance of parasitic capacitor 57 of a particular display pixel 40 having data transmitted thereto via the data line 46.

Similarly, as illustrated in timing diagram 72, a data voltage 82 is represented, whereby the data voltage 82 corresponds to the voltage level of the image data being transmitted to a display pixel 40 during a refresh period 74. As illustrated, the data voltage 82 may correspond to a relative low data voltage value. The controller 60 may receive (at least) an indication of the refresh rate of the display 12A (which may correspond to the rate of refresh periods 74), an indication of the temperature, and an indication of the data line 46 voltage (e.g., the data voltage 82). The controller 60 may calculate and transmit a blank time voltage indication for the data line 46 as the output 68 based on one or more of the received indications, whereby the output 68 causes the source driver 34 to transmit a blank time voltage 84 along data line 46 subsequent to or immediately subsequent to transmission of the image data along the data line 46. As illustrated in timing diagram 72, this blank time voltage 84 may be generally higher than the data voltage 82 so as to compensate (e.g., offset) the relatively low data voltage 82 to mitigate the parasitic capacitance of parasitic capacitor 57 of a particular display pixel 40 having data transmitted thereto via the data line 46. However, the controller 60 may instead be programmed and/or directed (e.g., via processor 18) to calculate and transmit a different blank time voltage indication for the data line 46 as the output 68 based on, for example, different voltage levels of the image data being transmitted to a display pixel 40 during a refresh period 74.

Figure 9:
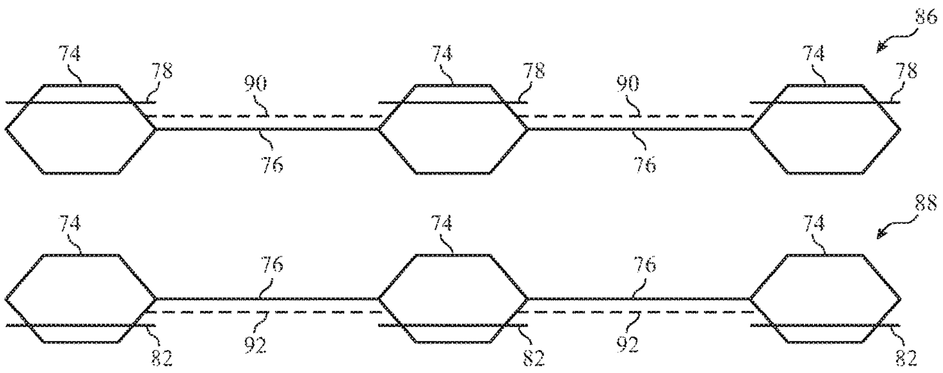
FIG. 9 illustrates timing diagrams of the OLED electronic display of FIG. 6 operating in a second mode, in accordance with an embodiment.

For example, FIG. 9 illustrates timing diagrams 86 and 88 of one of the data lines 46 of the display 12A. Similar to FIG. 8, each refresh period 74 for the data line 46 may represent a period in time in which a display pixel 40 coupled to the data line 46 is having image data driven thereto. Each of the refresh periods 74 is followed by a blanking period 76 during which image data is being driven on other data lines 46 of the display 12A. Furthermore, as illustrated in timing diagram 86, a data voltage 78 is represented, whereby the data voltage 78 corresponds to the voltage level of the image data being transmitted to a display pixel 40 during a refresh period 74. As illustrated, the data voltage 78 may correspond to a relative high data voltage value.

As previously discussed, the controller 60 may receive (at least) an indication of the refresh rate of the display 12A (which may correspond to the rate of refresh periods 74), an indication of the temperature, and an indication of the data line 46 voltage (e.g., the data voltage 78). The controller 60 may calculate and transmit a blank time voltage indication for the data line 46 as the output 68 based on one or more of the received indications, whereby the output 68 causes the source driver 34 to transmit a blank time voltage 90 along data line 46 subsequent to or immediately subsequent to transmission of image data along data line 46. As illustrated in timing diagram 86, this blank time voltage 90 may be generally approximate to but less than the data voltage 78 (e.g., a relative high voltage level) so as to mitigate changes in voltage along the data line 46 between the data voltage 78 and the blank time voltage 90, while still compensating for the parasitic capacitance of parasitic capacitor 57 of a particular display pixel 40 having data transmitted thereto via the data line 46.

Similarly, as illustrated in timing diagram 88, a data voltage 82 is represented, whereby the data voltage 82 corresponds to the voltage level of the image data being transmitted to a display pixel 40 during a refresh period 74. As illustrated, the data voltage 82 may correspond to a relative low data voltage value. The controller 60 may receive (at least) an indication of the refresh rate of the display 12A (which may corresponds to the rate of refresh periods 74), an indication of the temperature, and an indication of the data line 46 voltage (e.g., the data voltage 82). The controller 60 may calculate and transmit a blank time voltage indication for the data line 46 as the output 68 based on one or more of the received indications, whereby the output 68 causes the source driver 34 to transmit a blank time voltage 92 along data line 46. As illustrated in timing diagram 88, this blank time voltage 92 may be generally approximate to but greater than the data voltage 82 (e.g., a relative low voltage level) so as to mitigate changes in voltage along the data line 46 between the data voltage 82 and the blank time voltage 92, while still compensating for the parasitic capacitance of parasitic capacitor 57 of a particular display pixel 40 having data transmitted thereto via the data line 46. In this manner, both FIGS. 8 and 9 generally illustrate a technique using the controller 60 to employ content dependent data voltage parking during blank time of a data line 46 for image data coupling correction caused during a display 12A refresh. Additionally and/or alternatively, the controller 60 may be programmed and/or directed (e.g., via processor 18) to calculate and transmit a different blank time voltage indication for the data line 46 as the output 68 based on, for example, changes in the refresh rates of the display 12A.

Figure 10:
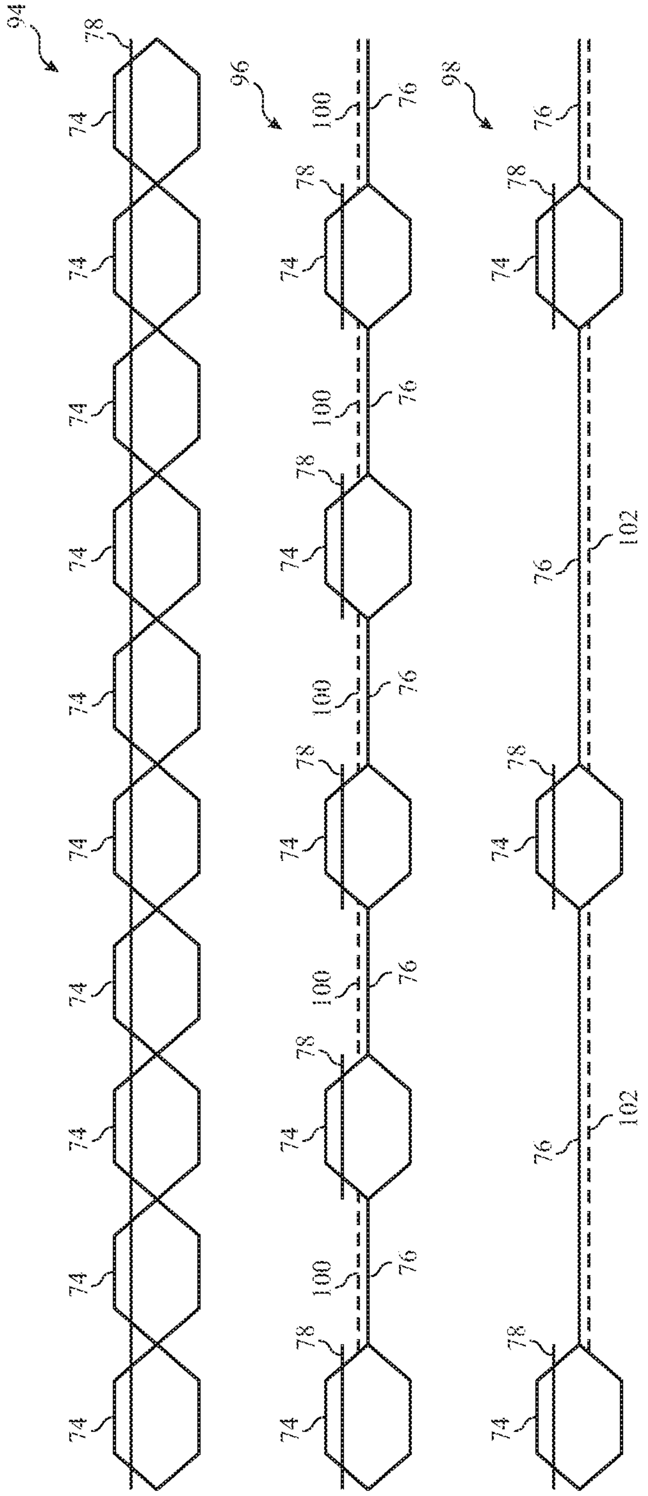
FIG. 10 illustrates timing diagrams of the OLED electronic display of FIG. 6 operating in a third mode, in accordance with an embodiment.

FIG. 10 illustrates timing diagrams 94, 96, and 98 of one of the data lines 46 of the display 12A. Similar to FIGS. 8 and 9, each refresh period 74 for the data line 46 may represent a period in time in which a display pixel 40 coupled to the data line 46 is having image data driven thereto. Timing diagram 94 represents a high refresh rate for display 12A (e.g., 240 Hz) with no blanking period 76 between each refresh period 74. In contrast, timing diagrams 96 and 98 represent, respectively, lower refresh rates (e.g., 120 Hz for timing diagram 96 and 60 Hz for timing diagram 98) each having a blanking period 76 between each refresh period 74 during which image data is being driven on other data lines 46 of the display 12A. Furthermore, as illustrated in timing diagrams 94, 96, and 98, a data voltage 78 is represented whereby the data voltage 78 corresponds to the voltage level of the image data being transmitted to a display pixel 40 during a refresh period 74. As illustrated, the data voltage 78 may correspond to a relative high data voltage value.

As previously discussed, the controller 60 may receive (at least) an indication of the refresh rate of the display 12A (which may correspond to the rate of the refresh periods 74), an indication of the temperature, and an indication of the data line 46 voltage (e.g., the data voltage 78). The controller 60 may calculate and transmit a blank time voltage indication for the data line 46 as the output 68 based on one or more of the received indications, whereby the output 68 causes the source driver 34 to transmit a blank time voltage 90 along data line 46. As illustrated in timing diagram 94, no blanking period 76 is present and, thus, no blank time voltage indication may be generated by the controller 60 as the display 12A operates at a refresh rate illustrated in timing diagram 94.

However, as the refresh rate of the display 12A is altered, as illustrated in timing diagram 96, the controller 60 may operate to calculate and transmit a blank time voltage indication for the data line 46 as the output 68 based on one or more of the received indications (including the refresh rate of the display 12A), whereby the output 68 causes the source driver 34 to transmit a blank time voltage 100 along data line 46. The blank time voltage 100 may be generally approximate to but less than the data voltage 78 (e.g., a relative high voltage level) so as to mitigate changes in voltage along the data line 46 between the data voltage 78 and the blank time voltage 100, while still compensating for the parasitic capacitance of parasitic capacitor 57 of a particular display pixel 40 having data transmitted thereto via the data line 46.

Additionally, as the display 12A continues to alter its refresh rate, as illustrated in timing diagram 98, the controller 60 may operate to calculate and transmit a blank time voltage indication for the data line 46 as the output 68 based on one or more of the received indications (including the refresh rate of the display 12A), whereby the output 68 causes the source driver 34 to transmit a blank time voltage 102 along data line 46. The blank time voltage 102 may be less than the data voltage 78 (e.g., a relative low voltage level) so as to compensate (e.g., offset) the relatively high data voltage 78 to mitigate the parasitic capacitance of parasitic capacitor 57 of a particular display pixel 40 having data transmitted thereto via the data line 46. Thus, as illustrated in FIG. 10, the controller 60 may be programmed and/or directed (e.g., via processor 18) to calculate and transmit a different blank time voltage indication for the data line 46 as the output 68 based on, for example, changes in the refresh rates of the display 12A. Additionally, this alteration of the blank time voltage indications may be done in a gradual manner (e.g., over the course of one or more frame refreshes of the display 12A or over the course of one or more blanking periods 76) so as to minimize visible luminance jumps in the display 12A for any of the output 68 generated by the controller 60.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:

a display configured to:

transmit image data along a data line of the display during a first refresh period; and not transmit the image data along the data line of the display during a first blanking period occurring directly after die first refresh period; and a controller configured to:

receive one or more values of one or more operational characteristics of the display;

dynamically calculate a blank time voltage for the data line of the display based on the one or more values immediately after the first refresh period, wherein the blank time voltage has a magnitude and polarity that compensates far parasitic capacitance on the data line of the display; and instruct the display to transmit the blank time voltage along the data line of the display during the first blanking period.

2. The electronic device of claim 1, wherein the display comprises a source driver configured to:

receive the instruction from the controller; and transmit the blank time voltage along the data line of the display during the first blanking period.

3. The electronic device of claim 2, wherein the source driver is configured to transmit the image data to a display pixel of the display, wherein the source driver is configured to prevent the blank time voltage from being transmitted to the display pixel.

4. The electronic device of claim 2, wherein the source driver is configured to transmit the blank time voltage as having a varying voltage level based on the instruction.

5. The electronic device of claim 1, wherein the controller is configured to receive a signal and cease transmission of the instruction based on the signal.

6. The electronic device of claim 1, wherein dynamically calculating the blank time voltage for the data line of the display comprises:

determining a refresh rate of the display as the one or more values; and dynamically calculating the blank time voltage based on the refresh rate, wherein the magnitude of the blank time voltage is lower than a magnitude of the image data and decreases as the refresh rate decreases to compensate far parasitic capacitance on the data line.

7. The electronic device of claim 1, wherein dynamically calculating the blank time voltage for the data line of the display comprises:

determining an ambient temperature value as the one or more values; and dynamically calculating the magnitude of the blank time voltage that is lower than the magnitude of the image data to compensate for parasitic capacitance on the data line.

8. The electronic device of claim 1, wherein dynamically calculating the blank time voltage for the data line of the display comprises:

determining a magnitude and polarity of the image data transmitted along the data line as the one or more values; and dynamically calculating the magnitude of the blank time voltage that is lower than the magnitude of the image data to compensate for parasitic capacitance on the data line.

9. The electronic device of claim 1, wherein the display comprises an organic light-emitting diode (OLED) display.

10. The electronic display of claim 1, wherein the controller is configured to:

receive a second one or more values of a second one or more operational characteristics of the display;

dynamically calculate a second blank time voltage for a second data line of the display based on the second one or more values immediately after a second refresh period occurring after the first blanking period, wherein the second blank time voltage has a magnitude and polarity that compensates for parasitic capacitance on the second data line of the display; and instruct the display to transmit the second blank time voltage along the second data line of the display during a second blanking period occurring after the second refresh period.

11. A tangible, non-transitory computer-readable medium configured to store Instructions executable by a processor of an electronic device, wherein the instructions comprise instructions to:

receive, via the processor, one or more values of one or more operational characteristics of a display of the electronic device;

dynamically calculate, via the processor, a blank time voltage for a data line of the display based on the one or more values immediately after a first refresh period has occurred and during a first blanking period, wherein image data is transmitted along the data line during the first refresh period and is not transmitted along the data lice during the first blanking period, wherein the blank time voltage has a magnitude and polarity that compensates for parasitic capacitance of the data line; and instruct, via the processor, the display to transmit the blank time voltage along the data line during the first blanking period.

12. The computer-readable medium of claim 11, comprising wherein instructions to dynamically calculate the blank time voltage comprise instructions to:

determine a magnitude and polarity of a voltage of the image data transmitted along the data line as the one or more values; and dynamically calculate the blank time voltage magnitude and polarity based on the image data voltage magnitude and polarity to compensate for parasitic capacitance on the data line.

13. The computer-readable medium of claim 12, comprising instructions to dynamically calculate the blank time voltage magnitude to be generally lower than the image data voltage magnitude in response to the image data voltage comprising a high magnitude.

14. The computer-readable medium of claim 12, comprising instructions to dynamically calculate the blank time voltage magnitude to be generally higher than the image data voltage magnitude in response to the image data voltage comprising a low magnitude.

15. The computer-readable medium of claim 12, comprising instructions to dynamically calculate the blank time voltage magnitude to be generally approximate to but less then the image data voltage magnitude in response to the image data voltage comprising a high voltage value.

16. The computer-readable medium of claim 12, comprising instructions to dynamically calculate the blank time voltage magnitude to be generally approximate to but greater than the image data voltage magnitude in response to the image data voltage comprising a low voltage value.

17. A controller configured to:

receive one or more values of one or more operational characteristics of a display;

determine whether the one or more values are greater than a predetermined threshold value;

dynamically calculate a blank time voltage for a data line of the display during a first blanking period occurring immediately after a first refresh period based on whether the one or mom values are greater than the predetermined threshold values are greater than the predetermined threshold value; wherein image data is transmitted along the data line during the first refresh period and is not transmitted along the data line during the first blanking period; and instruct the display to transmit the blank time voltage along the data line during the first blanking period to compensate for parasitic capacitance of the data line.

18. The controller of claim 17, wherein the controller is configured to dynamically not calculate the blank time voltage when a refresh rate of the display generates no blanking period between refresh periods.

19. The controller of claim 17, wherein the controller is configured to dynamically calculate the blank time voltage when a refresh rate of the display generates a blanking period between refresh periods.

20. The controller of claim 19, wherein the controller is configured to dynamically calculate the blank time voltage based upon a voltage level of the image data, the refresh rate of the display, or an ambient temperature value as the one or more values.

21. A method, comprising:

receiving a value of an operational characteristic of a display;

determining whether the value is greater than a predetermined threshold;

determine whether a refresh rate of the display generates a first blanking period between a first refresh period and a second refresh period, wherein image data is transmitted along a data line of the display during the first refresh period and the second refresh period and is not transmitted along the data line during the first blanking period; and dynamically calculate a blank time voltage for a data line of the display during the first blanking period occurring immediately after the first refresh period based on whether the value is greater than a predetermined threshold value and whether the first blanking period occurs.

* * * * *